(12) United States Patent
Hansen

(10) Patent No.: US 9,551,423 B2
(45) Date of Patent: Jan. 24, 2017

(54) BUTTERFLY VALVES

(71) Applicant: DYNAMIC AIR INC., St. Paul, MN (US)

(72) Inventor: Robert Hansen, Oakdale, MN (US)

(73) Assignee: Dynamic Air Inc., St. Paul, MN (US)

( * ) Notice: Subject to any disclaimer, the term of this patent is extended or adjusted under 35 U.S.C. 154(b) by 0 days.

(21) Appl. No.: 14/756,597

(22) Filed: Sep. 22, 2015

(65) Prior Publication Data

US 2016/0018006 A1 Jan. 21, 2016

Related U.S. Application Data

(62) Division of application No. 13/986,125, filed on Apr. 3, 2013, now Pat. No. 9,228,661.

(51) Int. Cl.
| | | |
|---|---|---|
| *F16K 1/22* | (2006.01) | |
| *F16K 1/228* | (2006.01) | |
| *F16K 37/00* | (2006.01) | |
| *A62C 3/02* | (2006.01) | |
| *B23P 15/00* | (2006.01) | |

(52) U.S. Cl.
CPC ............. *F16K 1/222* (2013.01); *A62C 3/0242* (2013.01); *B23P 15/001* (2013.01); *F16K 1/224* (2013.01); *F16K 1/228* (2013.01); *F16K 1/2285* (2013.01); *F16K 37/0041* (2013.01); *Y10T 137/0525* (2015.04); *Y10T 137/8225* (2015.04)

(58) Field of Classification Search
CPC ............. A62C 3/00; A62C 3/08; A62C 13/64; F16K 1/224; F16K 1/222; F16K 37/0008; F16K 37/0058; F16K 27/0218
USPC . 169/54, 62, 74; 251/308; 137/556; 244/136
See application file for complete search history.

(56) References Cited

U.S. PATENT DOCUMENTS

| | | | | |
|---|---|---|---|---|
| 3,684,239 A | * | 8/1972 | Schwartzbart | .......... F16K 1/228 251/173 |
| 4,936,389 A | * | 6/1990 | MacDonald | ............. B64D 1/16 137/398 |
| 6,354,567 B1 | * | 3/2002 | Vanderveen | ............ F02D 9/101 251/308 |
| 6,722,630 B2 | * | 4/2004 | Oberbeck | ............. F16K 1/2265 251/173 |

* cited by examiner

*Primary Examiner* — Matthew W Jellett
(74) *Attorney, Agent, or Firm* — Jacobson & Johnson LLC

(57) ABSTRACT

A lightweight butterfly valve having a disk maintained in a fixed position on a compound shaft through an interlocking relation ship between each of the individual shafts of the compound shaft and the disk as the disk is moveable between an open or closed position with the butterfly valve may having other features such as an electric drive to quickly rotate the compound shaft to provide for rapid opening and closing the butterfly valve, a disk position indicator and a shaft stop to prevent the disk from being driven past a full open condition.

6 Claims, 6 Drawing Sheets

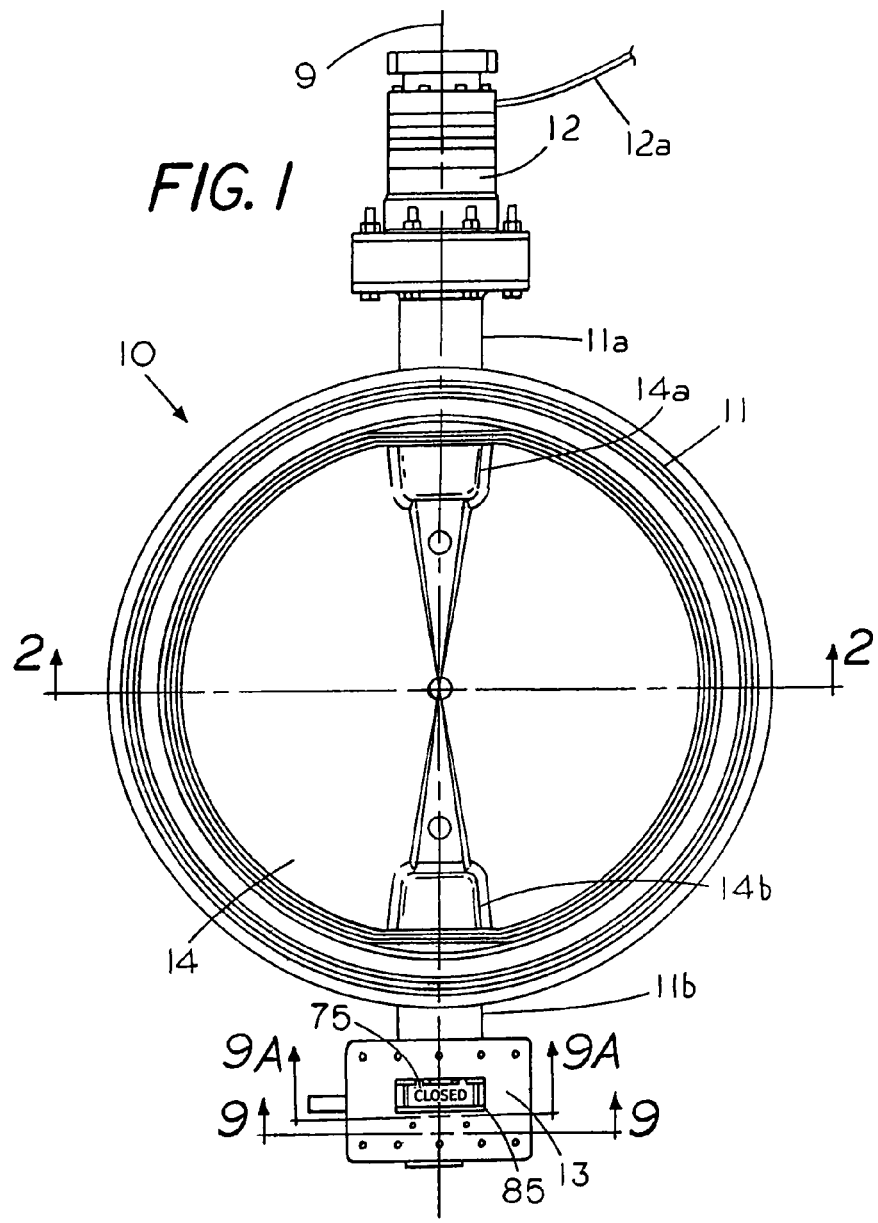
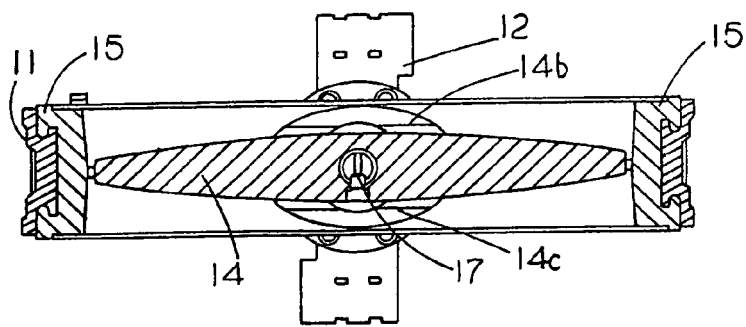

BUTTERFLY VALVES

CROSS REFERENCE TO RELATED APPLICATIONS

This application is a divisional application of application Ser. No. 13/986,125 filed on Apr. 3, 2013 titled Butterfly Valve (pending).

STATEMENT REGARDING FEDERALLY SPONSORED RESEARCH OR DEVELOPMENT

None

REFERENCE TO A MICROFICHE APPENDIX

None

BACKGROUND OF THE INVENTION

Butterfly valves are known in the art and typically comprise a circular disk that is rotateable from a first closed position where the disk extends across a circular opening in the butterfly valve to block flow of materials therethrough to a second open position where the circular disk extends edgewise across the circular opening to permit flow of materials through the circular opening in the butterfly valve.

Examples of butterfly valves include U.S. Pat. No. 5,295,659, which shows a butterfly valve having shaft seals to prevent leakage therepast as the circular disk is rotated from an open position to a closed position or vice versa.

Another butterfly valve is shown in U.S. Pat. No. 4,836,499, which includes a two-way dynamic annular inflatable disk seal that deflates to permit opening the valve and inflates to seal around the edges of the disk to prevent leakage therepast when the valve is in a closed condition.

A butterfly valve for handling hot materials is shown in U.S. Pat. No. 8,256,448. The valve includes an annular inflatable elastomer seal that seals around the edges of the disk to prevent leakage therepast. The seal is coupled with a housing that protects the seal from contact with hot materials that may exceed a temperature that could cause breakdown or rupture of the elastomer seal.

Still other butterfly valves, which may be used to handle bulk materials that are corrosive or abrasive, contain relative massive metal disks made from noncorrosive materials. Typically, the butterfly valves with metal disks enable one to move the disk from a no flow condition to a flow condition under a variety of temperature and pressure conditions by pivoting the disk about a diametrical shaft, which supports the metal disk.

SUMMARY OF THE INVENTION

A lightweight butterfly valve having a disk maintained in a fixed position on a compound disk shaft through an interlocking relation ship between each of the shafts of the compound disk shaft with the disk moveable between an open or closed position. The butterfly valve may include other features such an electric drive to quickly rotate the compound shaft for rapid opening and closing the butterfly valve, a disk position indicator and a shaft stop to prevent the disk from being driven past a full open condition.

BRIEF DESCRIPTION OF THE DRAWINGS

FIG. 1 is a front view of a butterfly valve in the closed condition;

FIG. 2 is a sectional view taken along lines 2-2 of FIG. 1;

DESCRIPTION OF THE PREFERRED EMBODIMENT

Figure 3:
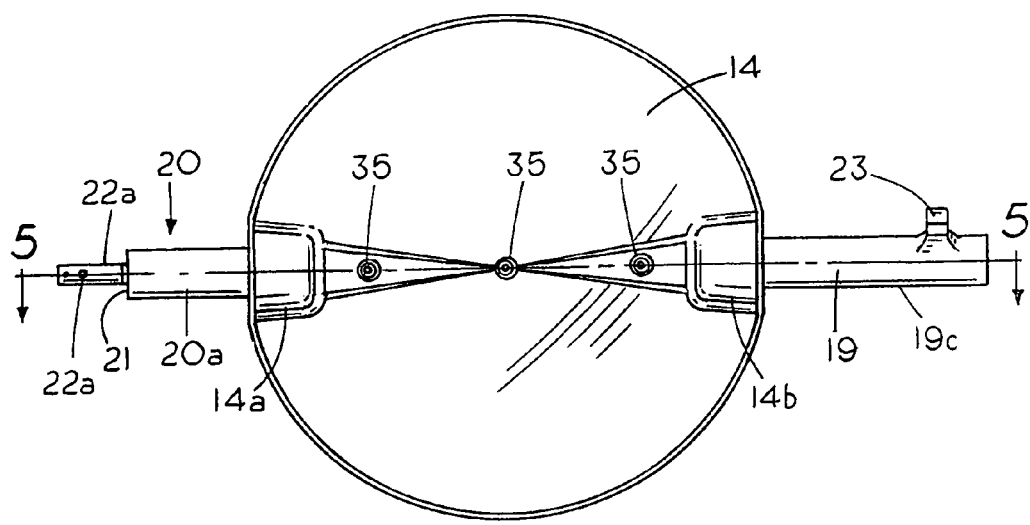
FIG. 3 is an isolated view of the disk and compound shaft for the butterfly valve of FIG. 1.

FIG. 1 is an isolated front view of a butterfly valve 10 in a closed condition with the butterfly valve having a one-piece circular housing 11 with a circular disk 14 rotateable mounted along a central axis 9 of the one piece circular housing 11. Valve 10 includes a lightweight corrosion resistant disk 14 for use in harsh environments such as with corrosive flowable materials with valve 10 capable of rapid opening or closing to enable an operator to quickly control delivery of large amounts of materials therethrough. While the butterfly valve 10 and the disk 14 may be made in various sizes, numerous problems can occur with opening and closing butterfly valves with larger diameter disks. For example, the forces generated on the disk by the conveyed material can disrupt the opening and closing of the disk, the support for the disk to the shaft as well as the sealing of the disk within the housing. In some cases, the circular disk may have a diameter on the order of 2 feet or more with the circular disk attached to the exterior of a cylindrical disk drive shaft that extends diametrically across a face of the disk. To open or close such a large valve the disk drive shaft, which rotatably supports the disk, must be rotated from a first open position to a second closed position or vice versa.

On one side of the disk the flowable material, which is controlled by the opening and closing of the butterfly valve, may be under pressure while the other side of the disk may not be under pressure thus creating a pressure differential across the disk. A differential pressures across the disk during rotation of the disk introduces stress on the components of the butterfly valve as well as the connections between the components. For example, if flowable material under pressure is located on the upstream side of the disk the pressure differential can result in stress on the fasteners, which secure the disk to the shaft, as the shaft rotates from one position to another since the disk and the shaft are separate components with the disk cantilevered outward from the shaft. In addition, adverse inertial forces on the connection between the shaft and the disk can occur if the disk is quickly opened or quickly closed, which may be compounded if the material deliverable though the butterfly valve is also under pressure.

In some cases the material delivered through the butterfly valve may be corrosive, which necessities using a disk made from a material that can withstand the corrosive flow materials deliverable through the butterfly valve. An example of one of a lightweight materials suitable for withstanding corrosion from flow materials is a polymer plastic such as nylon, however in comparison to metals most polymer plastics lack the strength of the metal disks and are not well suited to handling the material forces on the disk, particularly if the polymer plastic is mounted to the face of a cylindrical shaft that extends through the valve. Typical problems such as shearing the bolts holding the disk to the shaft may occur if the bolts are not sufficiently large or alternately the plastic of the disk may rupture or creep in response to the torque applied to the connection between the disk and the shaft during the opening and closing of the valve. Consequently, the disk and shaft connection becomes a potential troublesome link if the disk of the butterfly valve, which is under load, is quickly moved from a closed condition to a full open position or vice versa.

An example of one material which is useful in harsh environments that contains corrosive flow materials is a polymer such as nylon since nylon is resistant to most corrosive materials, however, the use of a non metal disk in a butterfly valve makes attachment of the disk on the shaft of the butterfly valve more difficult in comparison to the attachment of metal disks to the shaft since a non metal disk lacks the structural strength and rigidity of a metal disk. The present invention includes features that overcome the attachment problems of a lightweight polymer disk through use of a two part compound shaft, which extends through a diametrical passage in the disk. The two-part compound shaft rotationally supports the disk through an interlocking relationship between the disk and the compound shaft. In the example described herein each of the two-part compound shaft has a set of interlocking faces that engage sockets, which are located within hubs on the disk. The hubs, which may be molded or machined into the disk, are located on opposite ends of a diametrical passage extending through the disk. While the length of each of the two shafts in the compound shaft may not be of equal length the two shafts comprising the compound shaft are herein referred to as half shafts or stub shafts. Each of the hubs contain internal integral sockets therein having a set of faces for interlocking engagement with a set if mating faces on a half shaft or stub shaft of the compound shaft.

The sockets of the disk have a minimum dimension equal or larger than the diameter of the half shaft extending into the center of the disk to permit extending an end portion of each of the half shafts through the sockets and into end-to-end engagement with each other. To assemble the disk and two-part shaft compound shaft in an end-to-end condition one inserts one end of a first half shaft of the compound shaft into open end of the diametrical disk passage and a one end of the other half shaft of the compound shaft into the other end of the diametrical disk passage until the ends of the half shafts are brought into an end-to-end condition. In the end-to-end condition a male extension on one of the half shafts engages a female extension on the other half shaft. Once the half shafts are joined in an end-to-end condition fasteners may be extended through the disk and into each of the half shafts to firmly hold the disk on the compound shaft. The result is a two-part compound shaft that both rotationally supports the disk through an interlocking relationship that enables one to drive the disk from an open condition to a closed condition or vice versa since the interlocking or socket engagement between the hubs of the disk and the interlocking faces on each of the half shafts transfers the opening or closing torque from the compound shaft to the disk.

Figure 5:
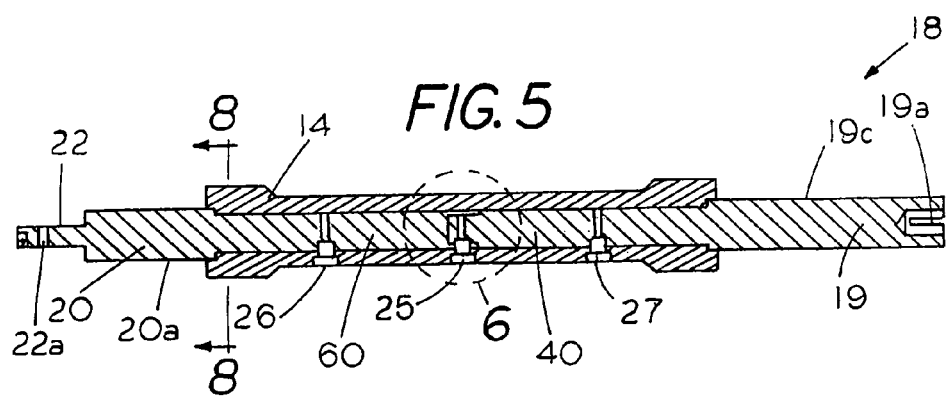
FIG. 5 is a sectional view taken along lines 5-5 of FIG. 3 showing the compound shaft.

FIG. 3 shows an isolated front view of the disk 14, with a disk shaft comprised of half shaft 20 and half shaft 19, which are joined in an end-to-end condition within the disk 14. A reference to FIG. 5 shows half shaft 20 and half shaft 19 form a compound shaft 18 and a reference to FIG. 1 shows a shaft housing 11a, which supports half shaft 20, connecting cylindrical housing 11 to an electrical drive mechanism 12 having leads 12a for controlling the electrical drive 12 through an external power source (not shown). Electrical drive 12 is of the type that can rotate a disk-supporting shaft therein from one position to another. The advantage of the electric drive is that the rotational position of the disk can be more easily monitored as well as the control of the rotational speed of the disk. In addition, the timing of the opening and closing of the disk can be more precisely controlled through integration to other systems, which enables the butterfly valve to be used in applications where the timing of the opening or closing of the butterfly valve is critical.

Figure 12:
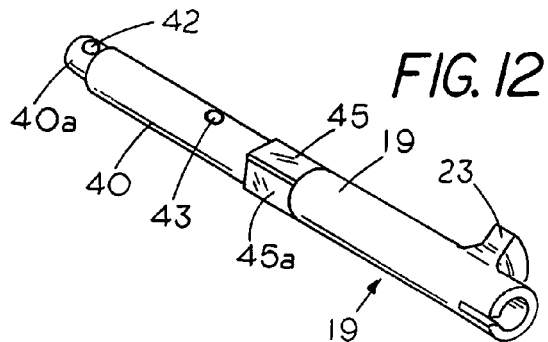
FIG. 12 is perspective view of a second shaft of the two-part compound shaft shown in FIG. 5.
Figure 13:
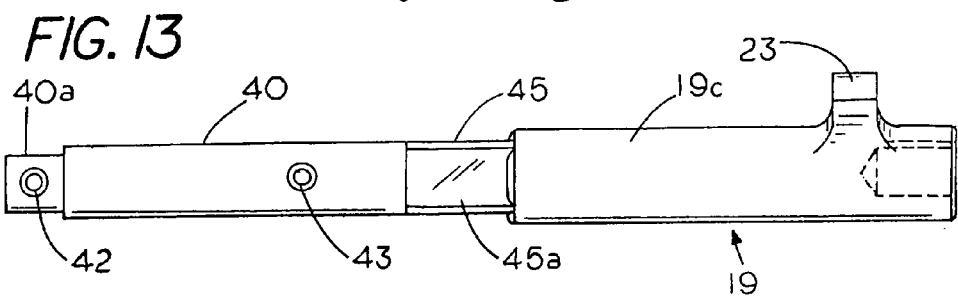
FIG. 13 is a top view of the second shaft of the two-part compound shaft shown in FIG. 5.

In the example of FIG. 1 the lower side of housing 11 contains a shaft housing 11b that supports an internal shaft stop and a shaft status indicator 13. Disk 14, which is made from a lightweight material such as nylon, is rotationally supported by a two-part compound drive shaft 18 which in this example is made from a different material than the disk 14, with the compound shaft 18 formed by half shaft 19 and half shaft 20, which are shown in isolated views in FIG. 10 and FIG. 12 and in end to end assembled view in FIG. 5.

In a conventional butterfly disks a one-piece rigid circular shaft extends through a circular passage in the disk with a set of bolts or fasteners used to rotationally secure the shaft to the disk to enable the shaft to rotate the disk from an open to closed position or vice versa. In the example shown in FIG. 1 the disk 14 contains two hubs 14a and 14b each one having an internal integral socket with faces thereon for forming interlocking relationship with drive members on a two part compound shaft 18 to rotationally secure the compound shaft to lightweight disk 14 as the disk is rotated from a closed condition to the open condition or vice versa. While the disk 14 is shown with two hubs for interlocking engaging with drive members from each of the half shafts it is envisioned that a single hub and a single drive member may be used without departing from the spirit and scope of the invention. In addition in some cases the external hubs may be eliminated with the sockets formed within the thickness of the disk 14.

FIG. 2 is a sectional view taken along lines 2-2 of FIG. 1 showing the position of the disk 14 in the closed condition but with the inflatable seal 15 in an unexpanded or non-sealing condition. In this example the inflatable seal 15 can be expanded to seal the edges of the disk 14 to the seal 15 to prevent leakage therepast when the valve in the closed condition. An inflatable seal for a butterfly valve is shown and described in Dynamic Air U.S. Pat. No. 4,836,499 and is herby incorporated by reference.

FIG. 3 is an isolated view of the disk 14 with half shaft 19 and half shaft 20 mounted therein for rotateable supporting butterfly valve disk 14. Half shaft 19 and half shaft 20 extend into the disk 14 from opposite sides of the disk and are secured to each other in an end-to-end condition as well as to the disk 14 though a set of bolts 35 that extend into the diametrical passage within disk 14. Half shaft 20 includes an annular shoulder 21 for limiting axial displacement of shaft 20 with respect to housing 11 as well as an extension 22 having a keyway 22a for forming engagement to the drive mechanism 12. The cylindrical surface 20a is journaled into an internal bearing surface within the housing 11 as is the cylindrical surface 19c to thereby provide for rotational engagement of shaft 19, shaft 20 and disk 14 with respect to housing 11.

Figure 4:
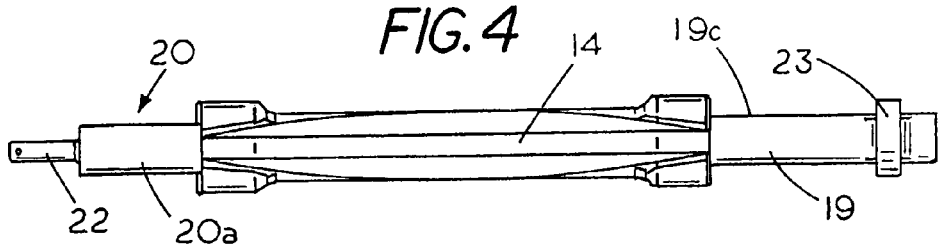
FIG. 4 is a top view of the disk and compound shaft of FIG. 3.

FIG. 4 is a top view of the disk 14 and two part compound shaft of FIG. 3 showing one half of the disk 14 supported by half shaft 20 and on the other half supported by half shaft 19. FIG. 5 comprises a sectional view taken along lines 5-5 of FIG. 3 revealing that half shaft 19 and half shaft 20 are securable to each other in an end-to end-condition within the disk 14 through fastener 35 (see FIG. 6A) to form the compound shaft 18. A fastener such as a shoulder bolt is insertable into a threaded recess 25 as well as into threaded recess 26 and 27 to secure the half shaft 19 and half shaft 20 to each other and to the disk 14. Shaft 19 and shaft 20 are referred to as half shafts since they meet in the interior of the disk 14 even though one shaft may be longer or shorter than the other shaft. Although the compound shaft 18 in the butterfly valve 10 uses two half shafts to form a compound drive shaft it is envisioned that the compound shaft could be formed from more than two shafts without departing from the spirit and scope of the invention.

Figure 6:
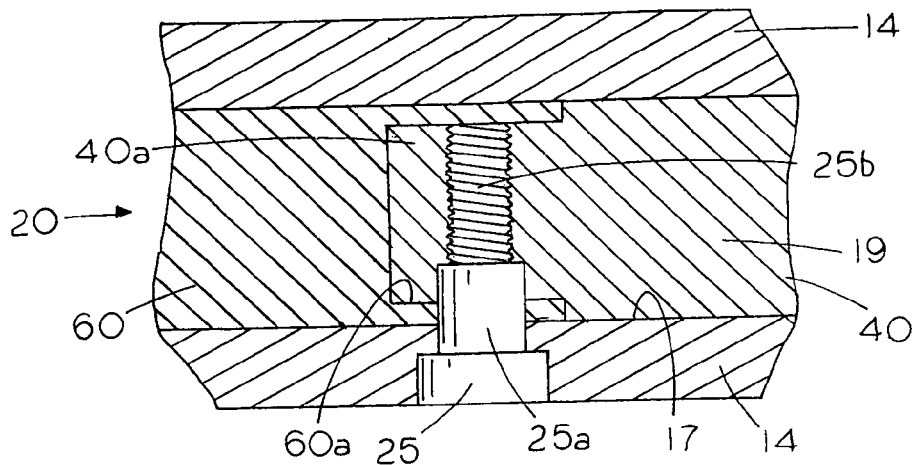
FIG. 6 is an enlarged isolated view taken from FIG. 5.
Figure 6A:
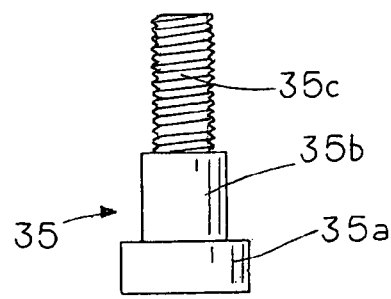
FIG. 6A is a shoulder bolt for securing sections of the compound shaft to each other as well as the disk to the shaft.

FIG. 6 is an enlarged isolated view taken from FIG. 5 to reveal the end-to-end interconnection of half shaft 19 and half shaft 20 to form a single compound shaft for supporting the disk 14. In the example shown the internal cylindrical section or internal end 60 of half shaft 20 has a cylindrical bore 60a for matingly receiving male end 40a of internal end 40 of half shaft 19. The internal end 60 of half shaft 20 and internal end 40 of half shaft 19 have smaller dimensions than the socket in disk 14 and can be inserted into a disk supporting condition in a central portion of the diametrical passage in disk 14 (see FIG. 5 and FIG. 8A) to provide an internal support for the disk 14 while the drive members on the shaft provide support for the outer diametrical portion of disk 14. FIG. 6A shows a typical fastener such as a shoulder bolt 35 for securing half shaft 20 and half shaft 19 to each other as well as securing the disk to each of the half shafts. Shoulder bolt 35 includes a head 35a with a female socket therein, a shoulder 35b for engaging bore 25a and threads 35c for engaging female threads 25b in the recess 25. When assembled the cylindrical shoulder 35 extends into the ends of half shaft 20 and half shaft 19 to hold the half shafts in an end-to-end condition as well as a non-rotateable condition with respect to each other. In addition the shoulder bolt 35 holds disk 14 to the shafts 19 and 20 since a countersunk recess 25 in disk 14 permits the head of bolt 35a to hold the disk 14 on the joined shafts 19 and 20 in a flush or non-protruding manner. As shown in FIG. 3, additional shoulder bolts 35 may be used to hold the disk 14 to each of the half shafts.

Figure 7:
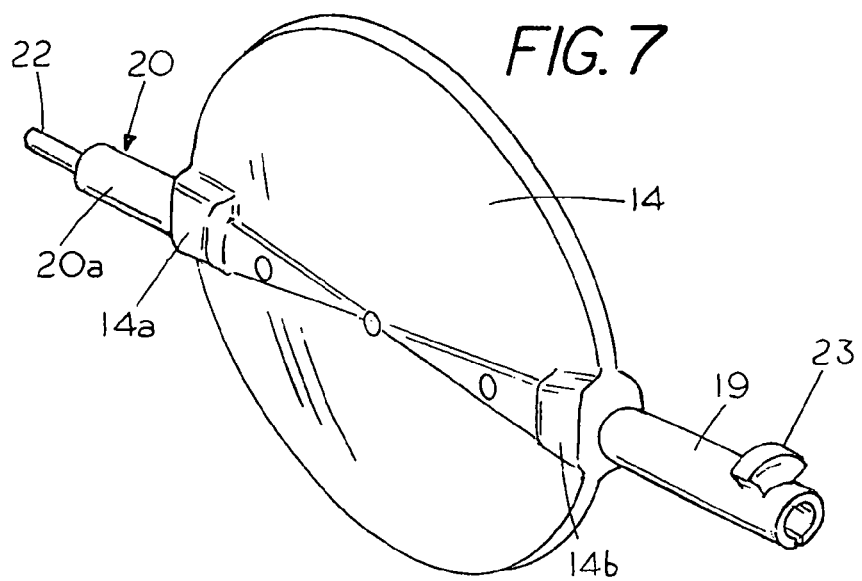
FIG. 7 is a perspective view of the disk and compound shaft of FIG. 3.
Figure 8:
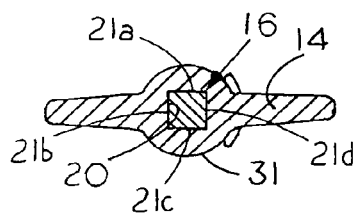
FIG. 8 is a sectional view taken along lines 8-8 of FIG. 5.
Figure 10:
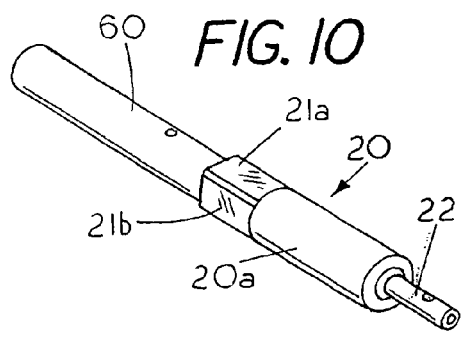
FIG. 10 is a perspective view of one shaft of the two-part compound shaft of the butterfly valve of FIG. 1.
Figure 10A:
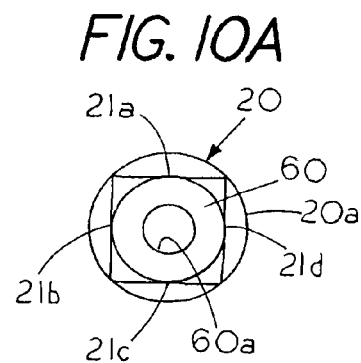
FIG. 10A is an end view of the one shaft of the two-part compound shaft shown in FIG. 10.
Figure 11:
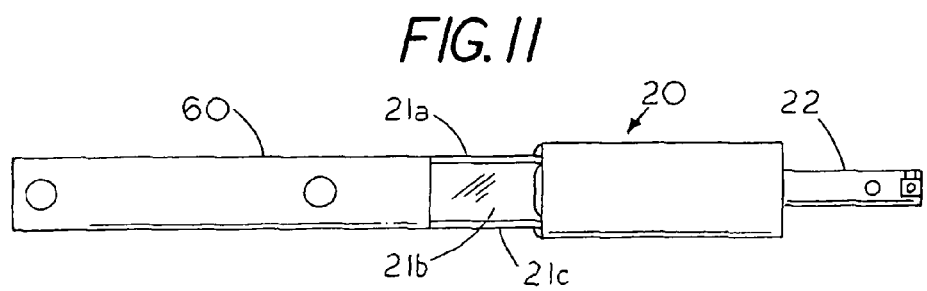
FIG. 11 is a front view of the one shaft of the two-part compound shaft shown in FIG. 10.

A reference to FIG. 7, FIG. 8, and FIG. 11 reveals the interlocking or interlocking engagement of a half shaft 20 with the disk 14. FIG. 7 shows the half shaft 20 extending outward from hub 14a of disk 14 and the half shaft 19 extending outward from hub 14b of disk 14. FIG. 10 is a perspective view of half shaft 20 of the two-part compound shaft of the butterfly valve revealing the cylindrical end section 60 for extending into the diametrical passage in the disk 14 as well a set of mutually perpendicular flat faces 21a and 21b. FIG. 10A is an end view of the half shaft 20 of the two-part compound shaft of FIG. 10 revealing the set of four flat faces 21a, 21b, 21c and 21d forming a drive member for rotating disk 14. Flat faces 21a, 21b, 21c and 21d are mutually perpendicular for engagement with an integral internal socket in hub 14a with the socket having a maximum dimension that is equal or greater than the diameter of the portion of half shaft 20 that extends into the central portion of the disk 14 to enable the end 60 of the half shaft 20 to be inserted into the disk 14.

Figure 8A:
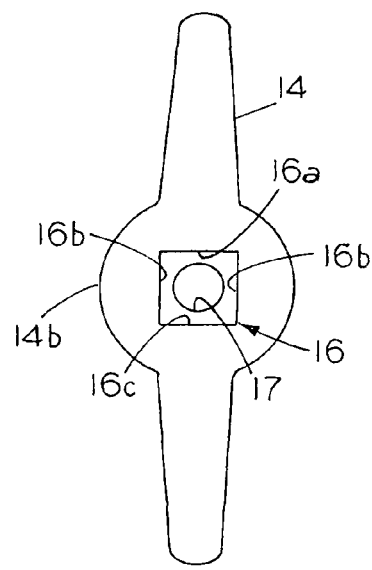
FIG. 8A is an end view of the disk without a shaft therein.

FIG. 8, which is a sectional view taken along lines 8-8 of FIG. 5, reveals a socket 16 on one end of disk 14 in interlocking engagement with flat faces 21a, 21b, 21c and 21d of half shaft 20 to prevent rotation of shaft 20 with respect to disk 14. FIG. 8A is an end view of disk 14 without a shaft therein revealing the internal integral socket 16 having a set of flat faces that are perpendicular to each other. Socket 16 is located in a hub 14b with socket 16 having flat faces 16a, 16b 16c and 16d that form interlocking and interlocking engagement with the flat faces 21a, 21b, 21c, and 21d thereby forming a drive member of stub shaft 20. A cylindrical diametrical passage 17 extends through the central portion of disk 14 for receiving the ends of the half shafts. Located in hub 14a (not shown) is an identical internal integral socket comprised of a set of four flat faces that are mutually perpendicular to each other for mating with similar flat faces on a drive member on half shaft 19. While each of the hubs 14a and 14b contain identical sockets with four flats that interfit with a male drive member on shaft 19 or a male drive member on shaft 20 other shapes of interlocking arrangements including more or less flats may be used. Similarly, other interlocking shapes such as splines may be formed in the disk and the shaft in the disk so that each of the stub shafts can form interlocking engagement with the socket in the hub. Likewise a non-circular passage in the disk that mates with a non-circular disk shaft may be used to prevent rotation of the disk 14 with respect to the disk shaft 18. As shown in FIG. 5 the compound shaft 18 extends through the disk 14 with the compound shaft comprising a first half shaft 19 and a second half shaft 20 with each half shaft having a drive member with a cross sectional dimension larger than a central passage 17 (FIG. 8A) through the disk 14 and an internal end 60, 40 of each of the half shafts having a cross sectional dimension lesser than the central passage of the disk for insertion of the half shafts into an end-to-end engagement for supporting a central portion of the disk (FIG. 5).

Thus in the example shown the compound shaft 18 extends through the housing with the compound shaft comprising a first half shaft 19 and a second half shaft 20 with each half shaft having a drive member with a cross sectional dimension larger than a central passage 17 through the disk and an internal cylindrical end 40 on the first half shaft 19 and an internal cylindrical end 60 of the second half shaft 20 having a cross sectional diameter lesser than a diameter of the central passage 17 through the disk to thereby enable insertion of the internal end 40 of the first half shaft 19 and the internal end 60 of the second half shaft 20 into a central portion of the central passage of the disk as shown in FIG. 5.

A reference to FIGS. 12-16 reveals the second half shaft 19 of the two-part compound shaft having a set of flats 45*a*, 45*b*, 45*c* and 45*d* for forming interlocking engagement with a socket in hub 14*b* of disk 14. The socket in hub 14*a* is identical to the socket 16 of hub 14*b*, which is shown in FIG. 8A. Half shaft 19 includes a cylindrical inner section 40*a* for extending into and into end-to-end engagement with half shaft 20. Half shaft 19 includes a cylindrical bearing surface 19*c* for journaling in a bearing in housing 11*b* and a cylindrical extension 40 that extend into disk 14. The extension 40*a* mates with a cylindrical bore 60*a* in shaft 20 with female threaded member 42 and 43 providing for thread engagement of a shoulder bolt 35 as shown in FIG. 6. Half shaft 19 differs from half shaft 20 in that half shaft 19 includes a radial extending stop 23 that limits the rotation of the shaft 19 and consequently the rotation of disk 14.

Figure 9:
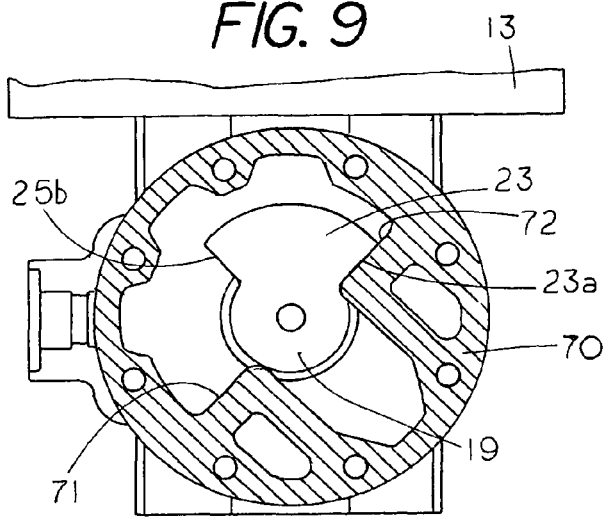
FIG. 9 is a sectional view of a shaft stop taken along lines 9-9 of FIG. 1.
Figure 14:
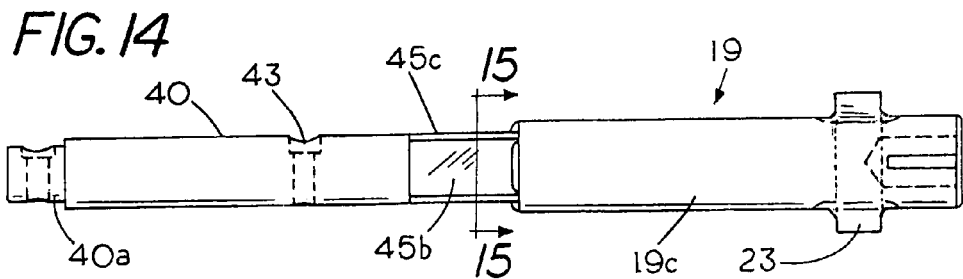
FIG. 14 is a front view of the second shaft of the two-part compound shaft shown in FIG. 5.
Figure 15:
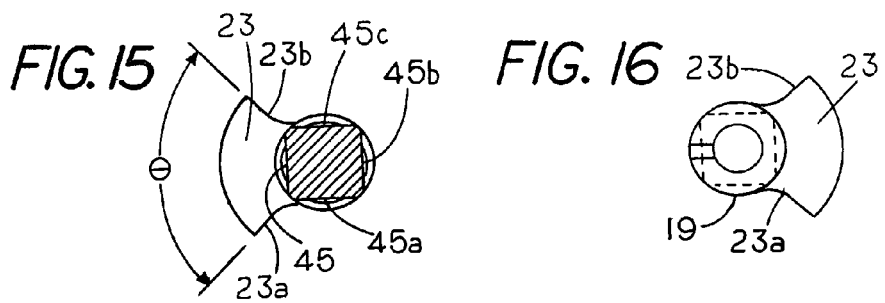
FIG. 15 is a sectional view taken along lines 15-15 of FIG. 14.
Figure 16:
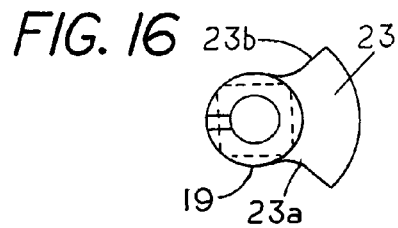
FIG. 16 is an end view of shaft of the two-part compound shaft shown in FIG. 12.

FIG. 15 shows a sectional view taken along lines 15-15 of FIG. 14 revealing the flats as well as the radial stop 23 that extends though an angle Θ, which in this case is 90 degrees. Radial stop 23 includes a first contact face 23*b* and a second contact face 23*a* that engage opposite sides of a cylindrical member having a radial stop 70 which includes a stop surface 71 on one side and a stop surface 72 on the opposite side. FIG. 9, which is taken along lines 9-9 of FIG. 1, shows the end of shaft 19 with the radial stop 23*a* in engagement with stop surface 72. In the example shown the stop surface 71 and stop surface 72 extend along a diameter extending through a central axis of shaft 19. Since radial stop 23 extends through an angle of 90 degrees the disk attached thereto can rotate 90 degrees, which allows the disk 14 to be pivoted from the open condition to the closed condition or vice versa.

Figure 9A:
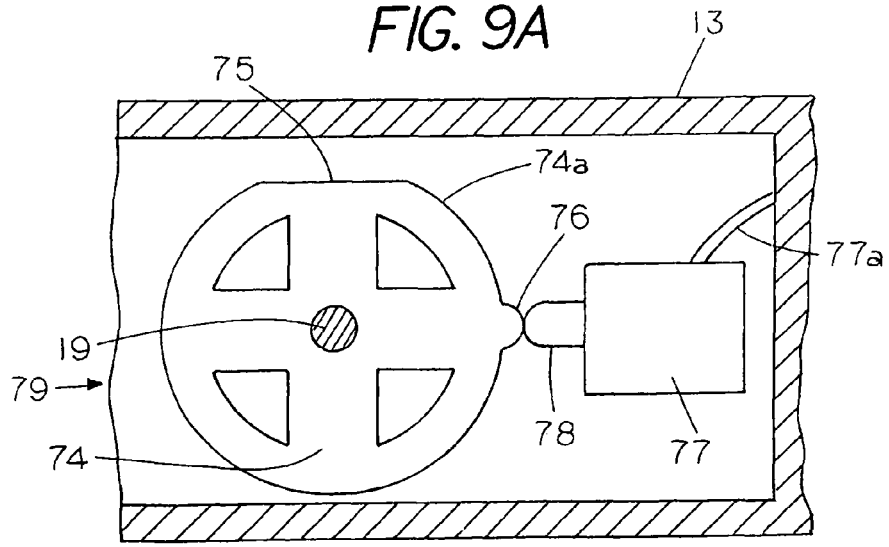
FIG. 9A is a sectional view of a disk position indicator taken along lines 9A-9A of FIG. 1 when the disk is in an a closed position.

One of the features of the invention is a disk position sensor that prevents the annular inflatable seal 15 from being accidentally inflated if the disk 14 is in an open condition thereby preventing damage to the seal as well as the disk. FIG. 9A is an sectional view of a disk position indicator 79 taken along lines 9A-9A of FIG. 1 with disk position sensor 77 sensing that the disk 14 of butterfly valve 10 is in a closed position as shown in FIG. 1. The disk position indicator 79 includes two alert features, one of which is a visible alert face 75 (see FIG. 1) that is located on flat face 75 of cam wheel 74. Cam wheel 74 is fixedly attached to drive shaft 19 so that rotation of the disk 14 from an open to the closed position and vice versa causes a corresponding rotation of cam wheel 74. Cam wheel 74 includes an outer peripheral surface 74*a* having a radial protrusion 76 on one peripheral portion of the cam wheel and flat surface 75 on another portion of cam wheel 74. A disk position sensor 77 having an extendable member or cam follower 78 is shown with the cam follower 78 in engagement with cam wheel 74 with the cam follower 78 responsive to the radial protrusion on the cam wheel 74 and hence the position of the disk 14 with respect to the inflatable seal. For example, with the cam wheel 74 in the position shown in FIG. 9A a signal is sent through leads 77*a* that permits the inflatable seal 15 to be inflated. Thus disk position sensor 77 provides a safety feature to valve 10 that prevents inflating the annular seal when the disk is not in the closed condition.

Figure 9B:
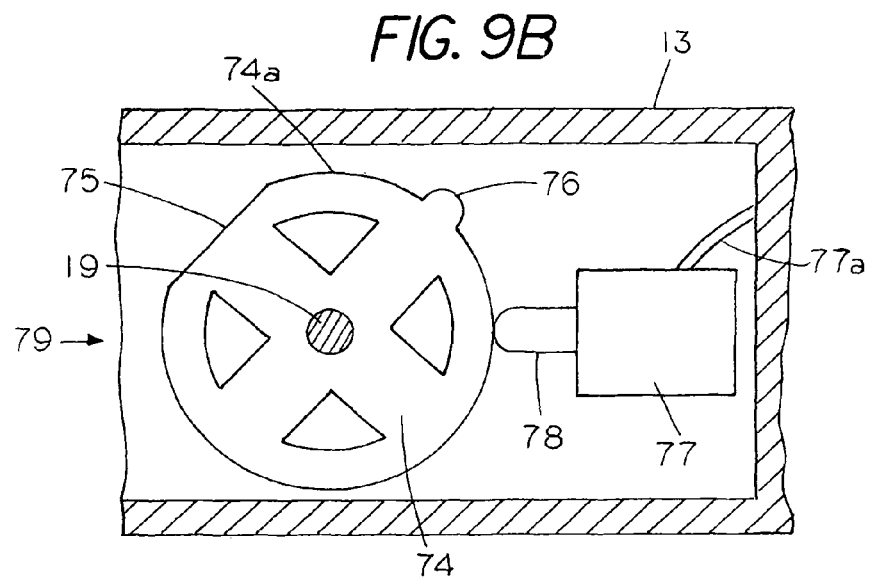
FIG. 9B is a sectional view of the disk position indicator of FIG. 9A showing the disk position indicator in the open position.

FIG. 9B shows the cam follower 78 rotated from the position shown in FIG. 9A indicating that the disk 14 is in an open condition. In response to the open condition the cam follower 78 of sensor 77 extends outward from sensor 77 to thereby cause sensor 77 to indicate to the operator through electrical leads 77*a* that the disk 14 is in the open condition which prevents inflation of inflatable seal 15.

Although position indicator 79 in cooperation with cam wheel 74 provides an electrical signal to indicate the inflatable seal 15 is in a condition for inflation the cam wheel 74 can also provide a visual indication that the disk 14 is in proper position for inflation through an operator-viewing window 85 (see FIG. 1). For example, an operator looking through viewing window 85 is able to observe the flat 75 on cam wheel 74, which contains the message CLOSED. Thus the operator can visually determine the disk 14 is in the closed condition without actually viewing the disk 14.

Thus, the invention includes a butterfly valve 10 for opening and closing a passage through a housing 11 with the valve including a disk 14 rotateable between an open position and a closed position. A first stub shaft 20 extends into a passage 17 on a one side of the disk and a second stub shaft 19 extends into the passage 17 on an other side the disk. The disk 14 has at least one socket therein for forming an interlocking engagement with either the first stub shaft 20 or the second stub shaft 19 so that a rotation of the either or both of the first stub shaft 20 and the second stub shaft 19 rotates the disk from an open to closed position or vice versa.

Figure 17:
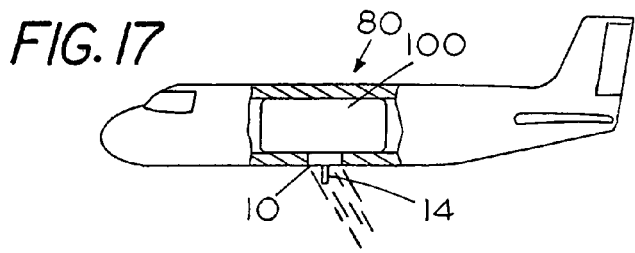
FIG. 17 is a partially sectional view of an aircraft having the butterfly valve dispensing fire retardant materials from a tank in the aircraft.

FIG. 17 illustrates the use of the lightweight butterfly valve of the present invention in flying tanker 80 for use in fighting forest fires or the like. In such an application the fire fighting material is located in tank 100 with the fire fighting material comprising a fire retardant in liquid or a flowable solid and in some cases water. Located on the bottom of tank 100 is the butterfly valve 10, which is shown with disk 14 in the open position, as the fire retardant flows therethrough. Fighting fires with flying aircraft requires a quick delivery of fire retardant since the aircraft has only a few seconds to the deliver the fire retardant before the aircraft is off target. The use of a large butterfly valve permits the fire retardant to be quickly emptied from tank 100. In addition since the aircraft may be flying at velocities in excess of 200 miles per hour it is important that one has accurate timing for the opening and closing the butterfly since a few seconds to early or a few seconds to late may cause the fire retardant to miss the target area. Consequently, the use of an electric drive 12 ensures that one can timely open or close the butterfly valve 10 to get maximum benefit from the dumping of the fire retardant. In addition the electric controls may be integrated with the navigation system of the plane 80 so that the opening and closing of the butterfly valve occurs based on the position of the plane with respect to the fire thereby maximizing the effectiveness of the release of the fire retardant.

A further feature of the invention is the method of making a butterfly valve that eliminates the need for a split housing for the butterfly valve. That is, one can forming a butterfly disk 14 with a diametrical passage 17 and a non-circular socket on at least one end of the passage and a hub one each end of the diametrical passage. One then extends a first half shaft 19 into one end of the diametrical passage 17 and a second half shaft 20 into the other end of the diametrical passage 17. Once extended therein one can couple the first half shaft to the second half shaft to form a compound shaft that rotationally supports disk 14.

Thus the step of extending the first half shaft 20 and the second half shaft 19 into interlocking engagement with ends of the diametrical passage 17 can be done when the disk 14 is located in housing 11 thus eliminating the need for a split housing when the disk 14 and shaft 18 are interlocking secured to each other.

As FIG. 17 illustrates the method may include the step of attaching the butterfly valve to an aircraft with a one side of the butterfly valve openable to the atmosphere outside the aircraft.

I claim:

1. A fire fighting apparatus comprising:
   a fire retardant;
   an aircraft for on-the-go delivery of the fire retardant;
   a storage tank for holding the fire retardant;
   a butterfly valve having a disk secured to a bottom of said storage tank with said butterfly valve openable to direct the fire retardant from the storage tank on to a target area, said butterfly valve containing a compound shaft with the compound shaft interfitted to a disk openable and closeable in response to an electrical signal, wherein said disk of the butterfly valve is nylon and the compound shaft comprises a first half shaft and a second half shaft joined in an end to end condition by a set of fasteners extending through the disk and into each of the half shafts; and
   an annular inflatable seal to seal the edges of the butterfly valve and to prevent leakage therepast when the butterfly valve is in a closed condition; and
   a disk position sensor that prevents the annular inflatable seal from being accidentally inflated when the disk is in an open condition thereby preventing damage to the annular inflatable seal and the disk.

2. A method of making a butterfly valve comprising:
   forming a butterfly disk with a diametrical passage and a non-circular socket on at least one end of the passage;
   extending a first half shaft into one end of the diametrical passage and a second half shaft into the other end of the diametrical passage;
   coupling the first half shaft to the second half shaft to form a compound shaft; and
   inserting a set of threaded fasteners through a set of threaded recess in the compound shaft for securing the first half shaft to the second half shaft in an end-to-end condition through the butterfly disk and for securing each half shaft to the butterfly disk to thereby allow the first half shaft and the second half shaft to transfer torque from the compound shaft to the butterfly disk.

3. The method of claim 2 wherein the step of extending the first half shaft into one end of the diametrical passage and a second half shaft into the other end of the diametrical passage when the disk is located in a butterfly valve housing.

4. The method of claim 2 including extending the first half shaft into interlocking relationship with a socket in the disk to prevent rotation of the disk with respect to a hub.

5. The method of claim 2 including the step of attaching the butterfly valve to an aircraft with a one side of the butterfly valve openable to the atmosphere outside the aircraft.

6. The method of claim 2 including the step of forming a hub with a socket on each end of a diametrical passage extending through the disk and interlocking engaging the socket on each end of the diametrical passage with the first half shaft and the second half shaft.

* * * * *